United States Patent
Wenger et al.

(10) Patent No.: US 6,325,054 B1
(45) Date of Patent: *Dec. 4, 2001

(54) INTERNAL COMBUSTION ENGINE WITH PRESSURE WAVE MACHINE

(75) Inventors: Urs Wenger, Langenthal; Roger Martin, Othmarsingen, both of (CH)

(73) Assignee: Swissauto Engineering S.A. (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/486,525

(22) PCT Filed: Aug. 25, 1998

(86) PCT No.: PCT/EP98/05375

§ 371 Date: Feb. 28, 2000

§ 102(e) Date: Feb. 28, 2000

(87) PCT Pub. No.: WO99/11912

PCT Pub. Date: Mar. 11, 1999

(30) Foreign Application Priority Data

Aug. 29, 1997 (EP) .................................. 97810616

(51) Int. Cl.$^7$ .................................................. F02B 33/42
(52) U.S. Cl. ........................ 123/559.2; 60/274; 60/280
(58) Field of Search ...................... 123/559.2; 60/274, 60/280

(56) References Cited

U.S. PATENT DOCUMENTS

| | | |
|---|---|---|
| 4,173,868 | 11/1979 | Wunsch . |
| 4,553,387 | 11/1985 | Mayer . |
| 4,702,075 | * 10/1987 | Jenny .................................... 60/274 |
| 6,089,211 | * 7/2000 | Wenger ............................ 123/559.2 |

FOREIGN PATENT DOCUMENTS

| | | |
|---|---|---|
| 663253 | 11/1987 | (CH) . |
| 4-081510 | 3/1992 | (JP) . |
| 97/20134 | 6/1997 | (WO) . |
| 97/33080 | 9/1997 | (WO) . |

* cited by examiner

*Primary Examiner*—Hoang Nguyen
(74) *Attorney, Agent, or Firm*—Ostrolenk, Faber, Gerb & Soffen, LLP

(57) ABSTRACT

The spark ignition engine is provided with a pressure wave machine and comprises a three-way catalyst. In order to improve the cold start properties both of the catalyst and of the pressure wave machine, a heating device is disposed between the catalyst and the pressure wave machine. For a better elimination of the pollutant constituents HC, CO, and NO$_x$, the three-way catalyst is followed by an oxidation catalyst, the oxidation catalyst being disposed between the outlet of the pressure wave machine and the exhaust. In this manner, the oxidation catalyst can operate with excess air which comes from the pressure wave machine. Such a combination yields a high specific power and at the same time an essential reduction of the pollutants while allowing very good cold start properties of the entire combination.

10 Claims, 4 Drawing Sheets

INTERNAL COMBUSTION ENGINE WITH PRESSURE WAVE MACHINE

BACKGROUND OF THE INVENTION

The present invention refers to an internal combustion engine, comprising a pressure wave machine and at least one catalyst, according to the preamble of claim 1.

A spark ignition engine comprising a pressure wave machine is described in WO 97/33080 to the applicant of the present invention. Besides the combination of a spark ignition engine with a pressure wave machine, a regulated three-way catalyst, and an oxidation catalyst, the application describes a heating device which is interposed between the motor outlet and the three-way catalyst.

Further tests have shown that the cold start properties of the catalyst can indeed be improved in this manner while those of the pressure wave machine are not improved as desired. Moreover, the invention should not be limited to a spark ignition engine.

SUMMARY OF THE INVENTION

On the background of this prior art, it is the object of the present invention to improve the cold start properties of the pressure wave machine, in particular. This object is attained according to the characteristics of claim 1.

Further characteristic features and advantages are defined in the dependent claims.

BRIEF DESCRIPTION OF THE DRAWINGS

The invention is explained in more detail hereinafter with reference to a drawing of an embodiment.

DETAILED DESCRIPTION OF THE INVENTION

Figure 1:
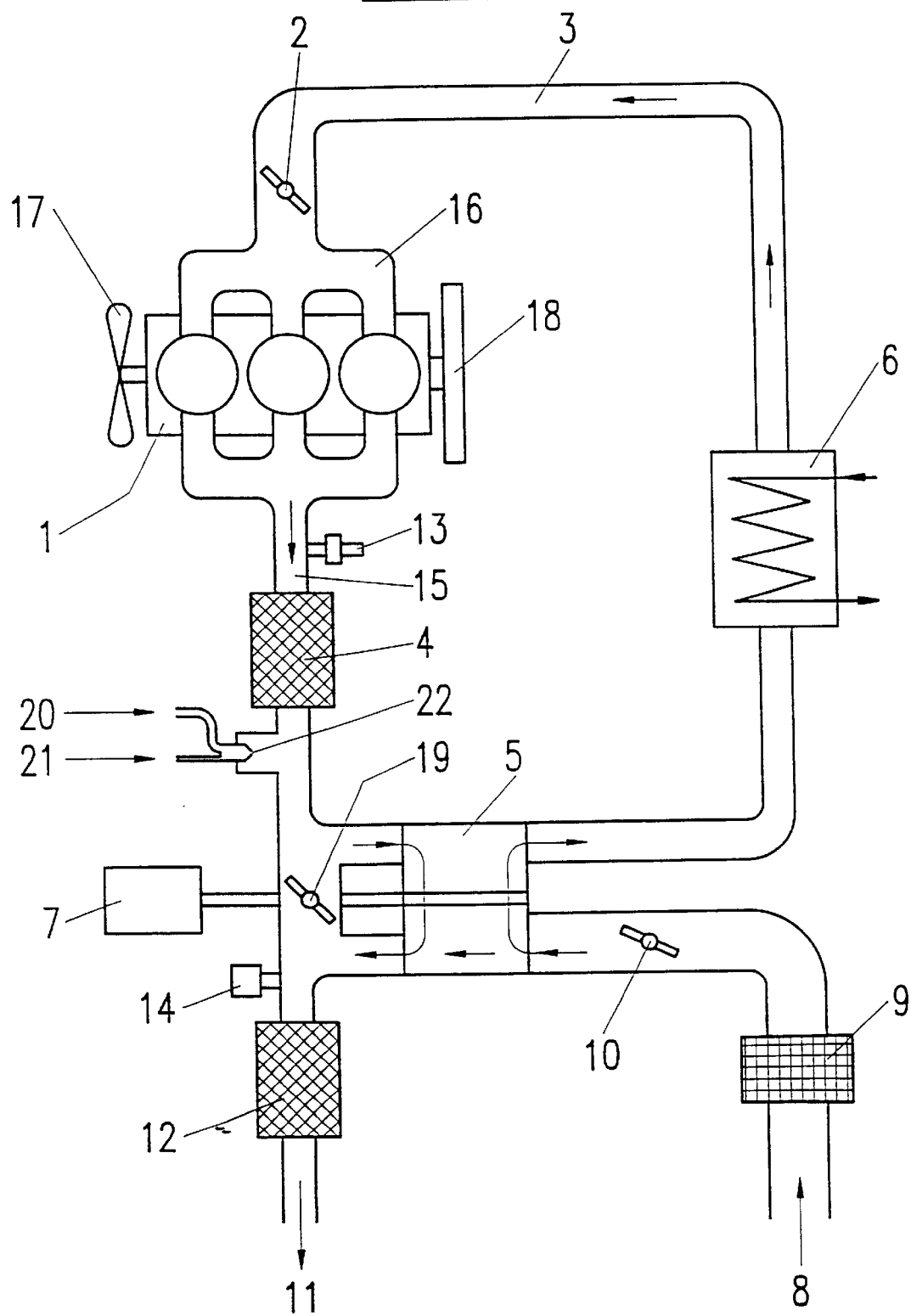
FIG. 1 schematically shows a combination according to the invention of a spark ignition engine with a pressure wave machine, an effective exhaust gas cleaning system, and a heating device.

FIG. 1 illustrates the spark ignition engine 1, i.e. an internal combustion engine, a throttle 2 in inlet channel 3, and a three-way catalyst 4 in outlet 15. The engine, which may be any known internal combustion engine such as an automobile or an aircraft engine and whose fan 17 and output 18 are illustrated, and three-way catalyst 4 form a conventional spark ignition engine as it is known from the prior art.

This conventional spark ignition engine is completed by a pressure wave machine 5 which is operated with an charge air cooler 6 in the inlet channel and comprises an electric or mechanical drive 7, as the case may be, which may also be omitted, however, if the pressure wave machine is suitably shaped and dimensioned. Air inlet 8 contains an air filter 9 and—in contrast to known pressure wave machine systems—a charger throttle 10. Exhaust 11 comprises a second catalyst in the form of an oxidation catalyst 12. The control of the catalysts is effected by lambda probe 13, temperature probe 14, and by the so-called wastegate flap 19.

The arrows in the channels indicate the course of the air and gas flows, and this schematic view shows that the fresh air is taken in at air inlet 8 and supplied to pressure wave machine 5 via air filter 9 and charger throttle 10. In the pressure wave machine, the major part of the fresh air is compressed under the action of the exhaust gases and supplied to engine 1 via charge air cooler 6 and throttle 2. A small portion of the fresh air passes through pressure wave machine 5 in the form of scavenging air and is discharged into exhaust 11, where it mixes with the exhaust gases. From internal combustion engine 1, the exhaust gases pass through three-way catalyst 4 and to pressure wave machine 5, where they are mixed with fresh air and subsequently discharged through oxidation catalyst 12 to exhaust 11.

Wastegate flap 19 may be opened in the case of an excessive charging pressure, so that a part of the exhaust gases is directed past pressure wave machine 5, thus resulting in a smaller pressure ratio. This allows to obtain a better overall efficiency of the driving unit and thus to reduce the fuel consumption. Instead of a wastegate flap, other means for the control of the charging pressure may be used which are known per se.

Charger throttle 10 serves for the control of the scavenging air. It allows to reduce the proportion of fresh air which passes to the exhaust. This results in an increase of the exhaust gas temperature at oxidation catalyst 12, so that the latter attains its starting temperature sooner and thus yields a higher conversion rate. The signal of temperature probe 14 may be used as a regulating variable for the control of the charger throttle. The engine speed and the pressure downstream of throttle 2 may serve as further control variables. Lambda probe 13 provides the regulating variable for the mixture control.

The engine is operated at a lambda ratio of 1 or with a slight fuel excess. It is generally acknowledged that a three-way catalyst in combination with an electronic mixture control (lambda probe) presently represents the most efficient catalytic exhaust gas cleaning system. It allows a simultaneous conversion of all three pollutant constituents but requires as precise a stoichiometric fuel-air mixture (lambda 1) as possible. The three constituents are HC, CO and $NO_x$. By shifting the control range lambda 1 to the richer side, the $NO_x$ constituents can be converted and eliminated very effectively. However, this would lead to a reduction of the conversion rate of the other two constituents and would therefore not be useful if merely a three-way catalyst is used.

The use of a pressure wave machine allows to increase the efficiency of the internal combustion engine and, due to the fact that the pressure wave machine produces an air excess in the exhaust system, allows the use of an oxidation catalyst at this point, whereby the remaining pollutants, which are mainly composed of HC and CO, can be optimally converted. Depending on the coating of the catalyst, a substantial $NO_x$ conversion rate can be obtained in the oxidation catalyst as well.

If the exhaust gas temperature at outlet 15 is low, e.g. in cold start conditions, the conversion rate of the catalyst is smaller, thus resulting in higher exhaust gas emissions.

Furthermore, as the exhaust gas temperatures decrease, the pressure wave process in the charger becomes more and more problematic, and the process can even be completely stopped in the extreme case. Consequently, only a reduced charging pressure can first be attained when the engine is cold, which leads to a reduced power of the engine.

The two problems can be counteracted in that between three-way catalyst 4 and the exhaust inlet of the pressure wave machine, a burner 22 is disposed which is activated when the exhaust gas temperature is low. In this manner, on one hand, the catalyst is brought to its optimum operating temperature more quickly and, on the other hand, the gases reach the pressure wave machine at a higher temperature. The pressure wave process is thus started while the engine is still cold, and the full power of the engine is available. FIG. 1 further illustrates air supply 20 and fuel supply 21 of burner 22.

Instead of a described burner 22, other heating devices may be used, e.g. an electrically operated heater. In this context it is important that both the function of the catalyst and that of the charger are advantageously influenced.

Accordingly, the combination of a spark ignition engine with a pressure wave machine allows an important increase in power and mainly also the application of a following oxidation catalyst which, on one hand, allows a more effective elimination of one of the pollutant constituents, namely $NO_x$, by the three-way catalyst than the conventional application of the three-way catalyst and, on the other hand, a particularly high conversion rate of the remaining pollutants HC and CO in the oxidation catalyst due to the air excess therein.

This combination results in a considerable reduction of the pollutants as compared to conventional spark ignition engines. It is understood that in comparison to a conventional spark ignition engine of the same power, the application of a pressure wave machine allows the use of a smaller engine having a lower fuel consumption or of an engine having a smaller total weight, while the presence of the heating device allows to obtain considerably reduced pollutant emissions and substantially improved cold start properties which may eliminate the need for gas pockets in the pressure wave machine.

Figure 2:
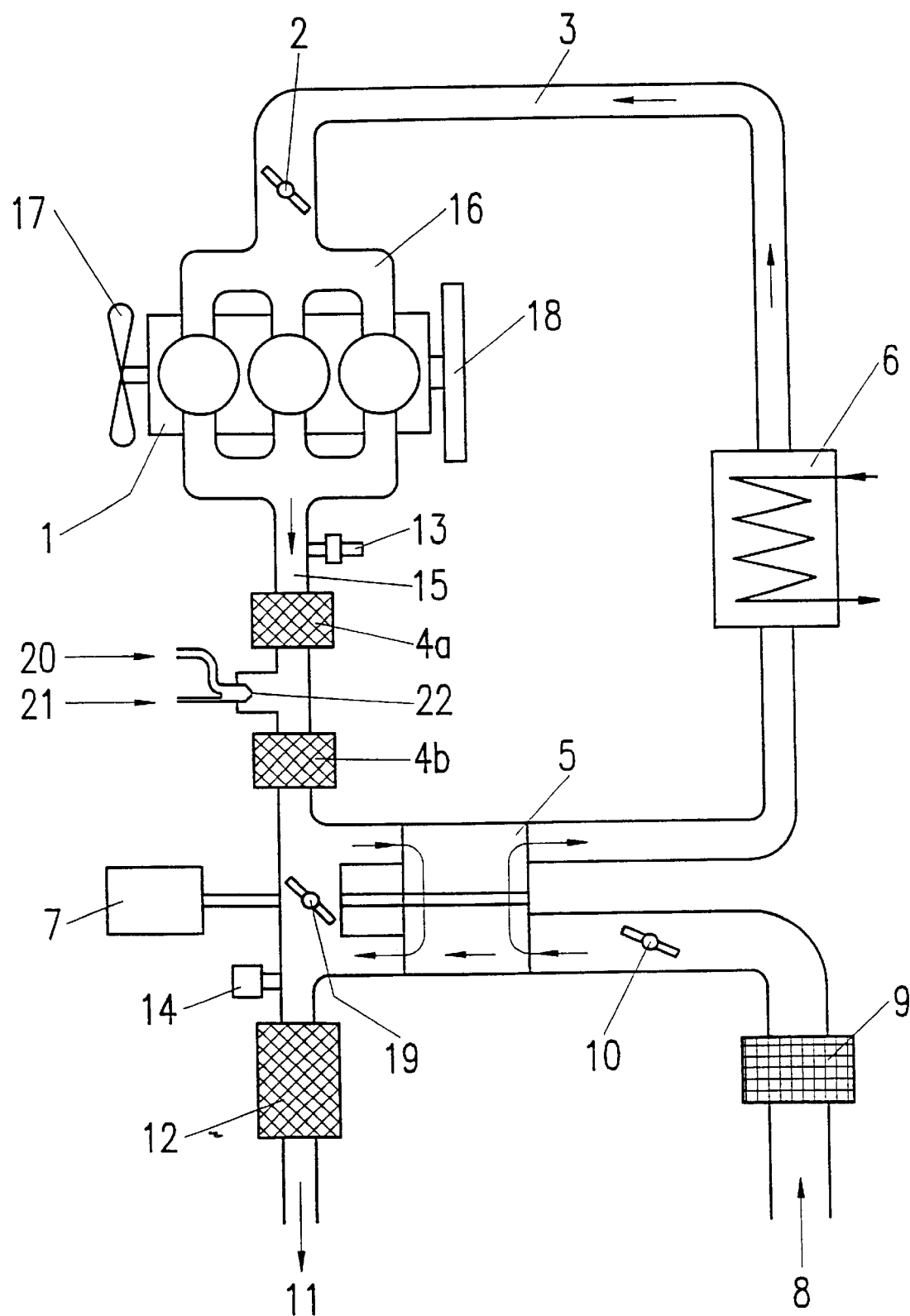
FIG. 2 shows an alternative of the combination according to FIG. 1.

FIG. 2 illustrates an alternative embodiment where the three-way catalyst is divided into two parts 4A and 4B and the heating device is disposed between the two parts of the catalyst. This allows to obtain an effective heating of the catalyst and of the inlet of the pressure wave machine.

Figure 3:
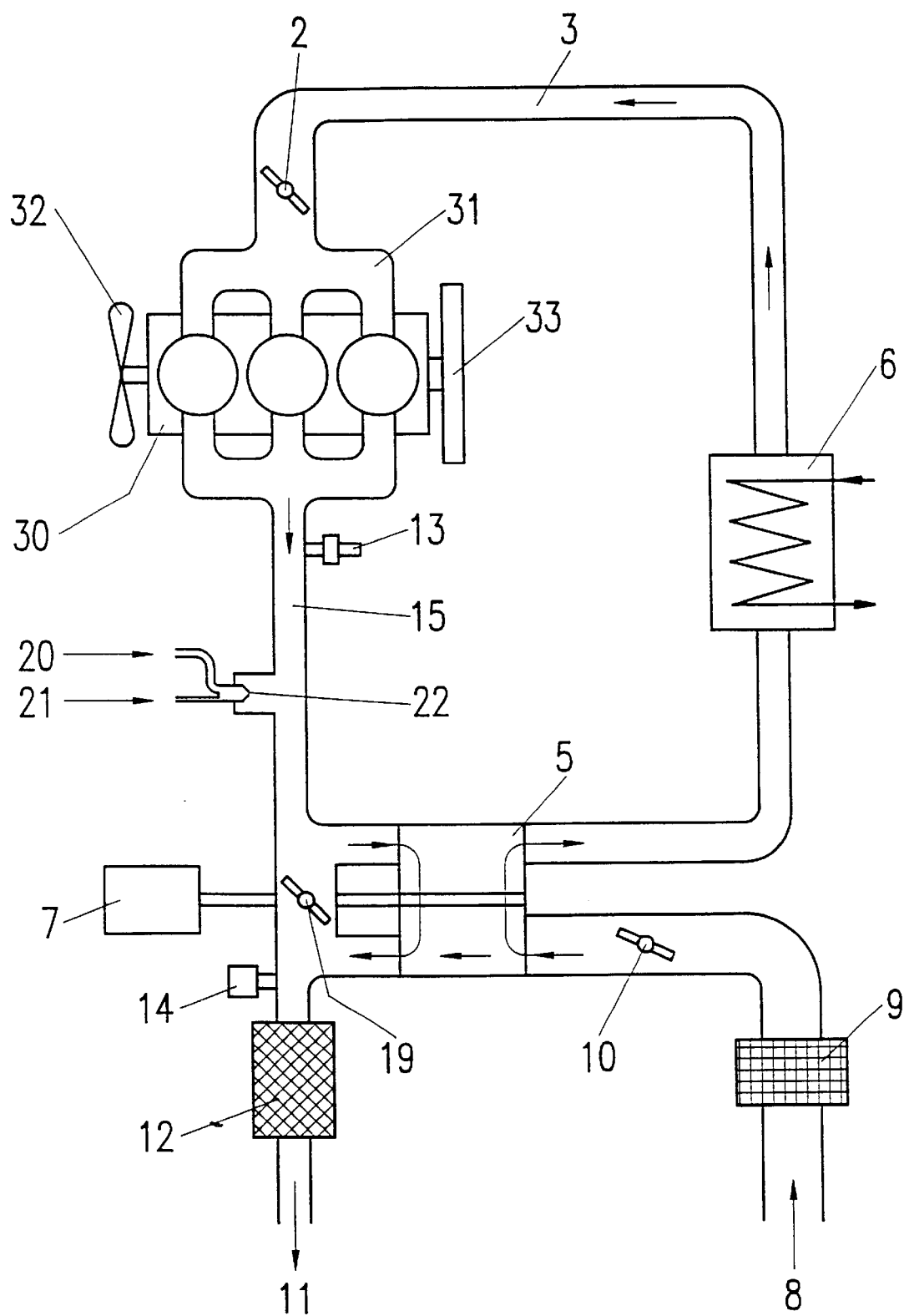
FIG. 3 schematically shows an alternative combination of a diesel engine with a pressure wave machine, an efficient exhaust gas cleaning system, and a heating device.

FIG. 3 shows an internal combustion engine 30 which is a diesel engine, the figure again illustrating air inlet 31, fan 32, and output 33. In contrast to the preceding examples, the diesel engine does not require a regulated three-way catalyst, so that the heating device 22, which may be the same as previously described, is disposed between the outlet of the diesel engine and the exhaust inlet of the pressure wave machine.

Figure 4:
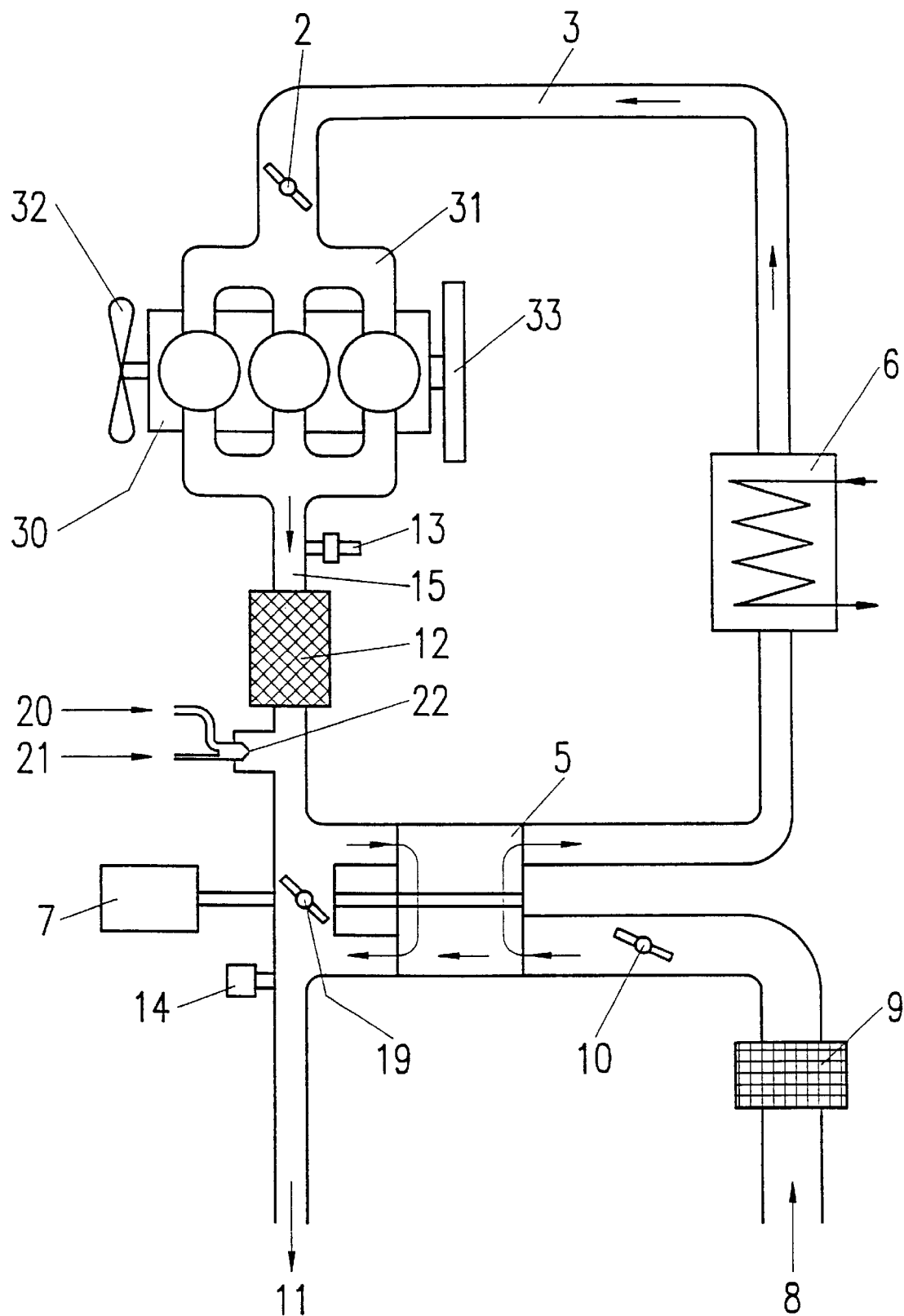
FIG. 4 shows an alternative embodiment of FIG. 3.

As the case may be, oxidation catalyst 12 may also be used for a diesel engine, the catalyst being either disposed between the pressure wave machine outlet and exhaust 11, as shown in FIG. 3, or between engine outlet 15 and the exhaust inlet of the pressure wave machine, as shown in FIG. 4. In the first case, the heating device is disposed as shown in FIG. 3, and otherwise it is disposed between the oxidation catalyst and the exhaust inlet of the pressure wave machine, as shown in FIG. 4.

What is claimed is:

1. In combination:

an engine having a first engine air inlet and a first engine exhaust outlet;

a pressure wave machine having a second air inlet in communication with the first engine air inlet, a first exhaust inlet in communication with the first engine exhaust outlet, and a second exhaust outlet from the pressure wave machine;

a catalyst disposed between the engine exhaust outlet and the first exhaust inlet of the pressure wave machine; and a heating device disposed between the catalyst and the first exhaust inlet of the pressure wave machine, the heating device operable to heat air flowing from the catalyst to the first exhaust inlet of the pressure wave machine.

2. The combination according to claim 1, wherein the catalyst comprises two separate parts and the heating device is disposed between the two parts of the catalyst so that the heater heats air flowing from one part of the catalyst to the other part of the catalyst.

3. The combination according to claim 1, further comprising:

a third exhaust in communication with the second exhaust outlet of the pressure wave machine; and an oxidation catalyst disposed between the second exhaust outlet of the pressure wave machine and the third exhaust.

4. In combination:

an engine having a first engine air inlet and a first engine exhaust outlet;

a pressure wave machine having a second air inlet in communication with the first engine air inlet, a first exhaust inlet in communication with the first engine exhaust outlet, and a second exhaust outlet;

a heating device disposed between the first engine exhaust outlet and the first exhaust inlet of pressure wave machine;

a third exhaust in communication with the second exhaust outlet of the pressure wave machine; and a catalyst disposed between the first engine exhaust outlet and the third exhaust.

5. The combination according to claim 4, wherein the catalyst is disposed between the first engine exhaust outlet and the first exhaust inlet of the pressure wave machine and the heating device is disposed between the catalyst and the first exhaust inlet of the pressure wave machine.

6. The combination according to claim 1, further comprising a charger throttle provided at the second air inlet of the pressure wave machine, the charging throttle operable to control an amount of scavenging air within the pressure wave machine.

7. The combination according to claim 1, further comprising a charging pressure controller provided at the second exhaust outlet of the pressure wave machine.

8. The combination according to claim 7, wherein the charging pressure controller is a wastegate flap.

9. The combination according to claim 1, wherein the pressure wave machine further comprises a drive operable to stabilize the speed of a cell rotor in the pressure wave machine.

10. The combination according to claim 1, wherein the heating device is a burner having an air and a fuel supply.

* * * * *